US012683936B2

(12) United States Patent
Takeoka

(10) Patent No.: US 12,683,936 B2
(45) Date of Patent: Jul. 14, 2026

(54) COMMUNICATION WITH IN-VEHICLE DATA COMMUNICATION MODULE USING NETWORK TUNNEL BASED ON USER SELECTION

(71) Applicant: TOYOTA JIDOSHA KABUSHIKI KAISHA, Toyota (JP)

(72) Inventor: Koji Takeoka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 18/591,246

(22) Filed: Feb. 29, 2024

(65) Prior Publication Data

US 2024/0414134 A1 Dec. 12, 2024

(30) Foreign Application Priority Data

Jun. 7, 2023 (JP) ................................. 2023-094159

(51) Int. Cl.
| | |
|---|---|
| *H04L 29/06* | (2006.01) |
| *H04L 9/40* | (2022.01) |
| *H04L 29/08* | (2006.01) |
| *H04W 4/48* | (2018.01) |

(52) U.S. Cl.
CPC ............. *H04L 63/029* (2013.01); *H04W 4/48* (2018.02)

(58) Field of Classification Search
CPC ............................... H04L 63/029; H04W 4/48
USPC .......................................................... 726/12
See application file for complete search history.

(56) References Cited

U.S. PATENT DOCUMENTS

| | | | | |
|---|---|---|---|---|
| 8,509,260 | B2 * | 8/2013 | Koenck ................. | G06F 1/1698 370/466 |
| 2007/0287407 | A1 * | 12/2007 | Ying .................... | H04B 1/3816 455/403 |
| 2013/0078909 | A1 * | 3/2013 | Smith ................. | H04M 1/0264 455/7 |
| 2015/0127755 | A1 * | 5/2015 | Roh ...................... | H04L 51/234 709/206 |
| 2017/0134946 | A1 | 5/2017 | Kang et al. | |
| 2018/0110081 | A1 | 4/2018 | Serna et al. | |
| 2018/0347531 | A1 * | 12/2018 | Tamane ................ | H04W 76/14 |
| 2020/0284883 | A1 * | 9/2020 | Ferreira ............... | G01S 7/4815 |
| 2020/0290752 | A1 * | 9/2020 | Kolosiuk ............... | B64U 70/95 |
| 2021/0031780 | A1 * | 2/2021 | Narayanasamy ........................... G08G 1/096708 |
| 2021/0112412 | A1 | 4/2021 | Ke | |
| 2022/0105933 | A1 * | 4/2022 | Shieh ................... | G06V 20/584 |
| 2022/0105934 | A1 * | 4/2022 | Shieh ................ | B60W 40/1005 |

(Continued)

FOREIGN PATENT DOCUMENTS

| | | |
|---|---|---|
| JP | 2002-185984 A | 6/2002 |
| JP | 2003-216637 A | 7/2003 |

(Continued)

*Primary Examiner* — Haresh N Patel
(74) *Attorney, Agent, or Firm* — SoraIP, Inc.

(57) ABSTRACT

A communication device communicating with an in-vehicle terminal includes a control unit that performs: authentication based on authentication information that the communication device receives from the in-vehicle terminal by using a tunnel established on an access network selected from among a plurality of access networks available for communication between the in-vehicle terminal and the communication device; and, when the authentication succeeds, routing of data received from the in-vehicle terminal.

3 Claims, 5 Drawing Sheets

(56) References Cited

U.S. PATENT DOCUMENTS

| | | | | |
|---|---|---|---|---|
| 2022/0295343 A1* | 9/2022 | Pefkianakis | ........ | H04W 36/304 |
| 2022/0366336 A1* | 11/2022 | Khasis | .................... | G08G 1/04 |
| 2022/0383728 A1* | 12/2022 | Brown | .................. | G08B 25/08 |
| 2023/0026835 A1* | 1/2023 | Nakata | ................. | H04W 28/10 |
| 2023/0260399 A1* | 8/2023 | Gaither | ................. | G08G 1/148 |
| | | | | 340/932.2 |

FOREIGN PATENT DOCUMENTS

| | | | | | |
|---|---|---|---|---|---|
| JP | 2016-111660 A | | 6/2016 | | |
| KR | 20210097471 A | * | 8/2021 | ........... | H04L 9/3297 |
| WO | WO-2021078233 A1 | * | 4/2021 | ............. | H04B 7/185 |

* cited by examiner

COMMUNICATION WITH IN-VEHICLE DATA COMMUNICATION MODULE USING NETWORK TUNNEL BASED ON USER SELECTION

CROSS-REFERENCE TO RELATED APPLICATION

This application claims priority to Japanese Patent Application No. 2023-094159 filed on Jun. 7, 2023, incorporated herein by reference in its entirety.

BACKGROUND

1. Technical Field

The present disclosure relates to a communication device and a communication control method.

2. Description of Related Art

Conventionally, there has been a system in which an in-vehicle terminal transmits request data including data on a current position of the in-vehicle terminal to a data center via the Internet, and the data center, after user authentication, extracts only information, of the latest information, that matches the current position of the user and provides the extracted information to the in-vehicle terminal (for example, Japanese Unexamined Patent Application Publication No. 2003-216637).

SUMMARY

An object of the present disclosure is to provide a communication device and a communication control method that make it possible to ensure reliability of communication between an in-vehicle terminal and a communication device.

An aspect of the present disclosure is a communication device communicating with an in-vehicle terminal, the communication device including a control unit that performs: authentication based on authentication information that the communication device receives from the in-vehicle terminal by using a tunnel established on an access network selected from among a plurality of access networks available for communication between the in-vehicle terminal and the communication device; and, when the authentication succeeds, routing of data received from the in-vehicle terminal.

Other aspects of the present disclosure include a communication control method executed by the communication device, a program causing a computer to operate as the communication device, a recording medium storing the program, and the like.

According to any one of the aspects of the present disclosure, it is possible to ensure reliability of communication between an in-vehicle terminal and the communication device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Business operators involved with vehicles (for example, manufacturers, dealers, rental companies, and the like of vehicles) having communication functionality, such as connected cars and self-driving vehicles, desire to collect vehicle-related data (for example, data related to driving of vehicles, data related to communication by vehicles, and the like), in some cases. Accordingly, it is considered to configure a communication device (communication facility) of a business operator to receive, via a network, predetermined data (IoT data) transmitted from an in-vehicle terminal mounted in each vehicle.

For the network connecting the in-vehicle terminal and the communication device, it is conceivable to use a network (referred to as the telecommunications carrier network) of a mobile network operator (MNO: also referred to as a telecommunications carrier) with which a user of a vehicle has signed a contract. However, to access the communication device, there is another conceivable case apart from via the telecommunications carrier network, such as via a telecommunications carrier network of another telecommunications carrier and the Internet, or via a wireless LAN and the Internet by using tethering. If users are allowed to select an access network to use to access the communication device from among a plurality of access networks, it becomes possible to transmit vehicle-related data to the communication device on conditions advantageous to users, and it therefore becomes easier to obtain cooperations from users in collecting vehicle-related data. On the other hand, it becomes possible for business operators to collect more data.

However, in cases where the Internet is included in a path over networks from an in-vehicle terminal up to the communication device, there has been a problem that reliability of communication lowers, compared to cases where only the telecommunications carrier network is used for a path. Moreover, there also has been a problem that a configuration and information to be included on an in-vehicle terminal side become complicated if information exchanged between an in-vehicle terminal and the communication device, particularly information related to authentication of the in-vehicle terminal, varies with differences in method of access from the in-vehicle terminal to the communication device.

In an embodiment described below, a communication system is described that can solve the problems described above. In other words, a communication system is described that can ensure reliability of communication (secure communication) even if a method of access to the communication device is left to the discretion of a user and, at the same time, can restrain the configuration of an in-vehicle terminal from being complicated as a result of making it possible to select an access method.

Figure 1:
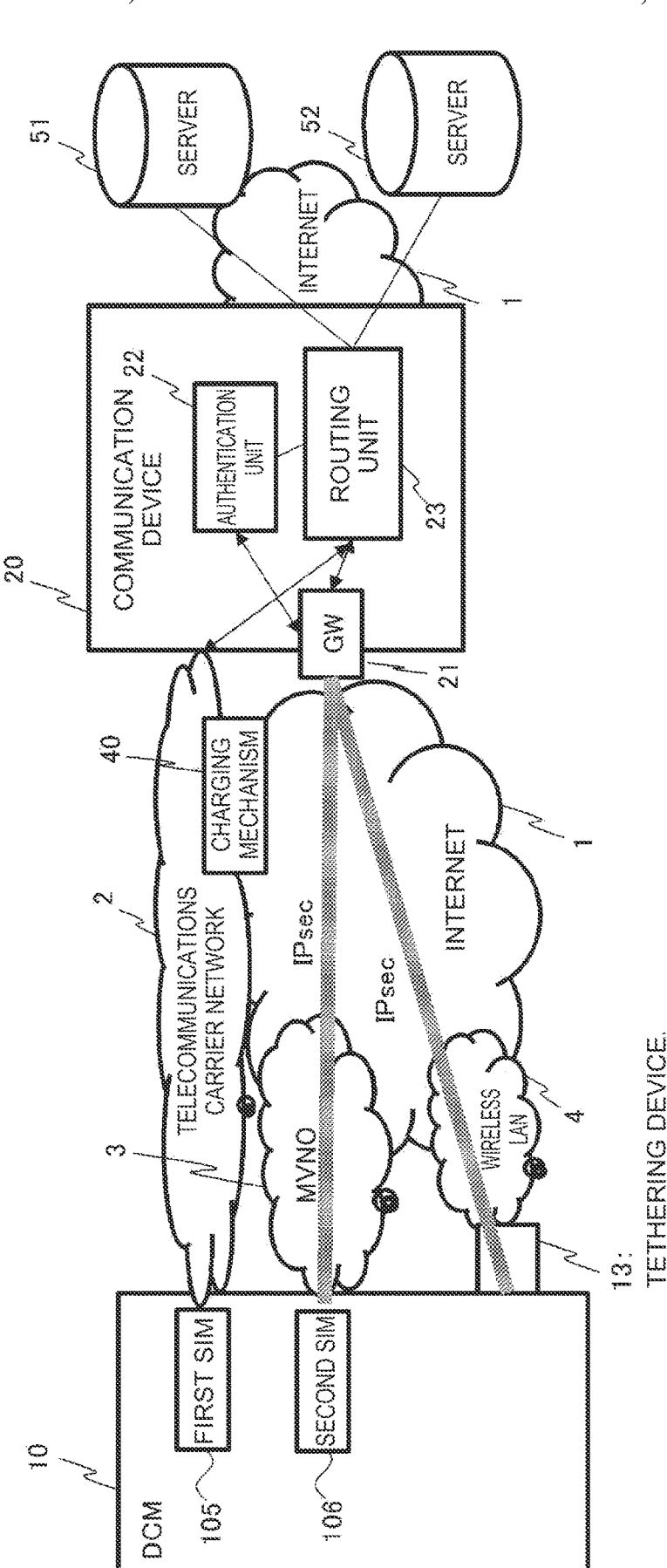
FIG. 1 shows an example of a communication system according to an embodiment.

Hereinafter, an embodiment of the present disclosure is described with reference to the drawings. Configurations according to the embodiment are presented for an illustrative purpose, and the present disclosure is not limited to such configurations in the embodiment. FIG. 1 shows an example of a communication system according to the embodiment. The communication system includes a data communication module (DCM) 10, which is an example of an in-vehicle terminal mounted in a vehicle, and a communication device 20. The in-vehicle terminal may be an information processing device other than the DCM. The in-vehicle terminal may be of a stationary type, or may have portability.

The DCM 10 can collect information related to the vehicle (data related to driving of the vehicle, such as a position or a vehicle speed) from in-vehicle devices (for example, a car navigation device, a dashcam, an electronic control unit (ECU), and the like). The DCM 10 can also collect data related to communication by the vehicle (in-vehicle terminal). Data (user data) transmitted from the DCM 10 is transmitted to a predetermined communication partner (for example, a server 51 or a server 52) via the communication device 20. However, the destination of the user data may be the communication device 20.

For a default network to be used for the DCM 10 to communicate with the communication device 20, a telecommunications carrier network 2 for use of which the user of the vehicle has signed a contract is used. The telecommunications carrier network may be a mobile network operator (MNO) network, or may be a mobile virtual network operator (MVNO) network. The telecommunications carrier network 2 includes a wireless access network (base station) and a core network. When the telecommunications carrier network 2 is used, the communication device 20 serves as part of the core network of the telecommunications carrier network 2. For authentication of the DCM 10 in the telecommunications carrier network 2, authentication information stored in a first subscriber identity module (SIM) 105 included in the DCM 10 is used.

In the present embodiment, for an access network other than the telecommunications carrier network 2, the user can use an MNO or MVNO network (an MVNO network 3 is illustrated in FIG. 1) other than the MNO network or the MVNO network that is the telecommunications carrier network 2. In such a case, for authentication of the DCM 10 in the MVNO network 3, authentication information stored in a second SIM 106 is used. Each of the telecommunications carrier network 2 and the MVNO network 3 may be a 4G (LTE) network, a 5G network, or a 6G network.

The user can also use a wireless LAN (Wi-Fi) 4 for an access network, through tethering using a tethering device 13. The tethering may be Wi-Fi tethering, Bluetooth® tethering, or universal serial bus (USB) tethering. When the MVNO network 3 or the wireless LAN 4 is used for an access network, a path from the DCM 10 up to the communication device 20 goes via the Internet 1. As described above, with regard to access to the communication device 20, the user can select an access network that the user desires to use, from among a plurality of access networks such as the MVNO network 3 and the wireless LAN 4, apart from the telecommunications carrier network 2. In other words, the DCM 10 can access the communication device 20 by using an access method selected by the user from among a plurality of access methods. The telecommunications carrier network is an example of a cellular network (first cellular network). The MVNO network 3 is an example of a second cellular network, and of a first access network via the second cellular network. The wireless LAN 4 is an example of a network used through tethering other than the first cellular network, and of a second access network via the network.

The communication device 20 can be configured by using a single computer or a set (cloud) of two or more computers. The communication device 20 includes a gateway (GW) 21 connected to the Internet 1. The GW 21 is a gateway accommodating non-3GPP® wireless accesses (untrusted non-3GPP® IP accesses) such as the Internet. For example, the GW 21 is an evolved packet data gateway (ePDG) when the communication device conforms with 4G, is a non-3GPP® interworking function (N3IWF) when the communication device conforms with 5G, and is a PDG when the communication device conforms with 3G. The GW 21 can convert a format of a signal received from the Internet 1 into a format that is suitable for the core network of the telecommunications carrier network 2 and is used in the communication device 20. In the Internet 1, reliability (security) of communications is poor, compared to in the telecommunications carrier network 2 (3GPP® wireless access). Accordingly, when the DCM 10 communicates with the communication device 20 by using an access network other than the telecommunications carrier network 2, a logical tunnel is established between the DCM 10 and the GW 21. The tunnel is, for example, an IPsec tunnel established in an IPsec tunnel mode. However, the tunnel may be a tunnel other than the IPsec tunnel.

The communication device 20 includes an authentication unit 22 and a routing unit 23. After the tunnel is established, the authentication unit 22 receives, via the GW 21, authentication information transmitted from the DCM 10 through the tunnel and performs authentication of the DCM 10 (user). In the present embodiment, for the authentication information, authentication information for authentication in the telecommunications carrier network 2, which is stored in the first SIM 105, is used. However, the authentication information may be authentication information stored in a secure storage area of the DCM 10, other than the first SIM 105. When the communication device 20 operates as part of an LTE (4G) core network, the authentication unit 22 operates as a home subscriber server (HSS) that performs authentication processing. However, the authentication unit 22 may operate as a combination of an HSS and authentication authorization accounting (AAA). When the communication device 20 operates as part of a 5G core network, the authentication unit 22 operates as an authentication server function (AUSF), that is, a network function that authenticates a subscriber/UE (DCM 10) based on subscriber information stored in a unified data management (UDM). For an authentication scheme, for example, EPA-AKA is applied. However, an authentication scheme other than EPA-AKA may be applied.

For the authentication information used when the DCM 10 accesses the communication device 20 by using an access network (access line) other than the telecommunications carrier network 2, common authentication information is used in either case of using the MVNO network 3 and tethering. In the present embodiment, for the common authentication information among a plurality of access networks, the authentication information (authentication information for the telecommunications carrier network 2) stored in the first SIM 105 is used.

The routing unit 23 performs configuration and determination of a path from the DCM 10 up to a destination of user data (communication partner: for example, the server 51 or the server 52). A communication path (session) is established between the routing unit 23 and the DCM 10. When the communication device 20 operates as part of the LTE (4G) core network, the routing unit 23 operates as a packet data network gateway (PGW). When the communication device 20 operates as part of the 5G core network, the routing unit 23 operates as a user plane function (UPF).

When the DCM 10 communicates with the server 51 or the server 52, data addressed to the server 51 or the server 52 always goes through the tunnel and arrives at the communication device 20 thanks to the routing unit 23, and is transmitted to the server 51 or the server 52 via the routing unit 23. Data addressed to the DCM 10 transmitted from the server 51 or the server 52 always passes through the communication device 20 and is transferred through the tunnel.

In a state where communication is being performed by using a path (referred to as the first route) between the DCM 10 and the communication device 20 via the telecommunications carrier network 2, a communication path (referred to as the second route) between the DCM 10 and the GW 21 may be established. In other words, the first route and the second route may be used in parallel.

Figure 2:
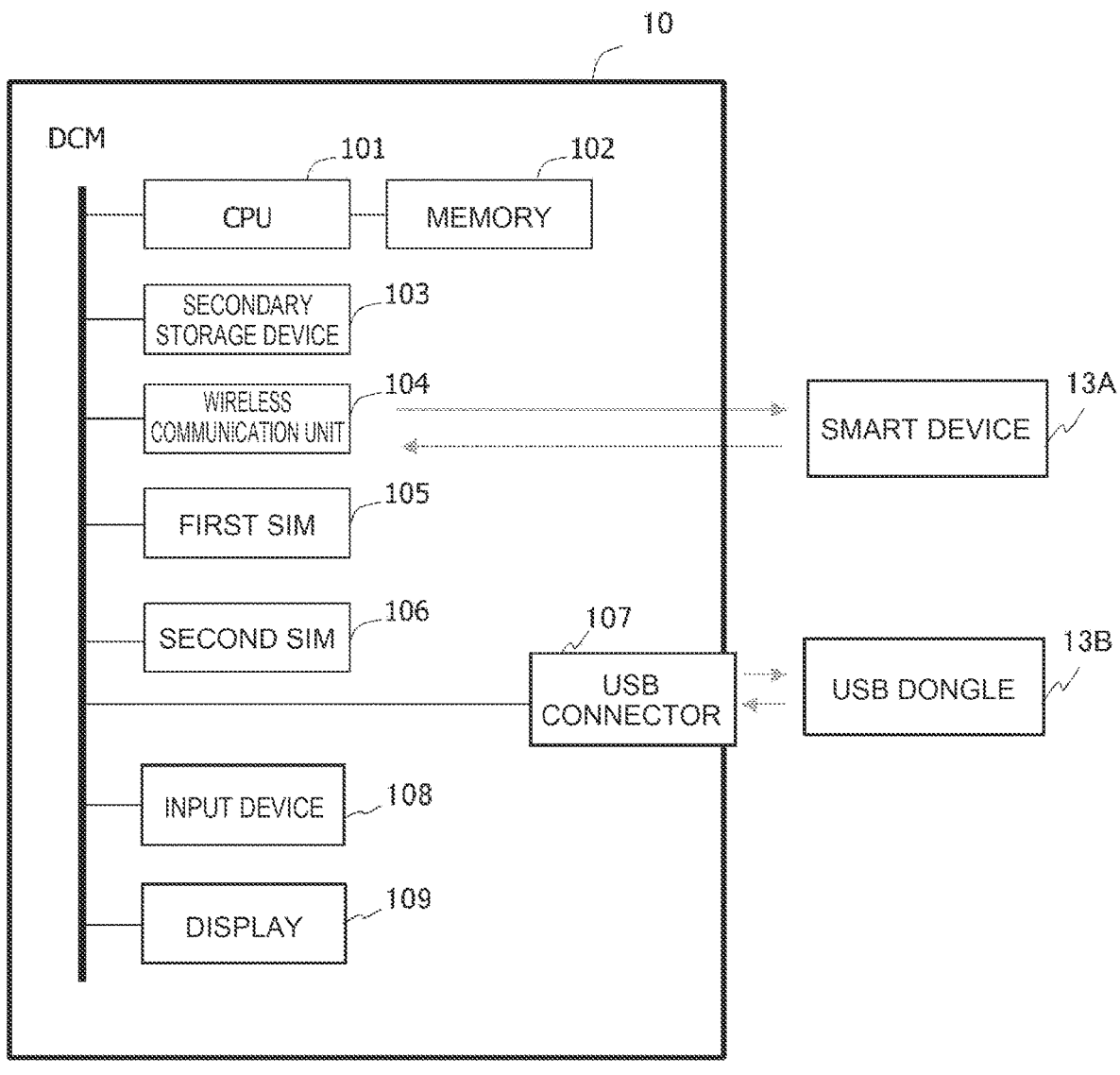
FIG. 2 shows an example of a configuration of a DCM.

FIG. 2 shows an example of a configuration of the DCM 10. The DCM 10 includes a CPU 101, a memory 102, a secondary storage device 103, a wireless communication unit 104, the first SIM 105, and the second SIM 106. Examples of the secondary storage device 103 include a hard disk drive (HDD), a solid state drive (SSD), an EEPROM, and the like. The secondary storage device 103 stores, for example, an operation system (OS) and a plurality of types of application programs (apps). The apps include apps programs for implementing various functions, such as a communication control program. Examples of the memory 102 include semiconductor memories, such as a read only memory (ROM) and a random access memory (RAM). Each of the memory 102 and the secondary storage device 103 (which are also collectively referred to as the storage device) is an example of a computer-readable recording medium.

The wireless communication unit 104 includes a data circuit-terminating equipment (DCE) and performs communication with an external device in accordance with a wireless communication scheme, such as cellular network (LTE, 4G, 5G, 6G, or the like), Bluetooth®, or wireless LAN (including IEEE 802.11 series, Wi-Fi, and the like). The external device is a base station in the case of telecommunications carrier network, is an access point in the case of wireless LAN (Wi-Fi), and is Bluetooth®-compatible communication equipment in the case of Bluetooth®.

Each of the first SIM 105 and the second SIM 106 is an eUICC. The first SIM 105 is a SIM for the telecommunications carrier network 2, and the second SIM 106 is a SIM for the MVNO network 3. The first SIM 105 and the second SIM 106 may be of a chip type or of a card type. When the SIM is of a card type, the DCM 10 includes a SIM slot, a SIM card reader, and the like.

Further, the DCM 10 includes a USB connector 107, an input device 108, and a display 109. A USB dongle 13B can be connected to the USB connector 107. A smart device 13A can also be connected to the USB connector 107 via a USB cable. The USB dongle 13B and the smart device 13A are examples of the tethering device 13. The smart device 13A is a smartphone, a tablet terminal, or the like.

The input device 108 is a button, a key, a touch panel, or the like and is used to input information, make settings, and the like. The display 109 is used to display information. The input device 108 may be a user interface displayed on the display 109.

The CPU 101 executes various processes related to operation of the DCM 10 (collection of data, reception of collected data, transmission and reception of data, and the like), by executing various programs stored in the storage device. The CPU 101 is an example of a control unit, a controller, or a processor.

Figure 3A:
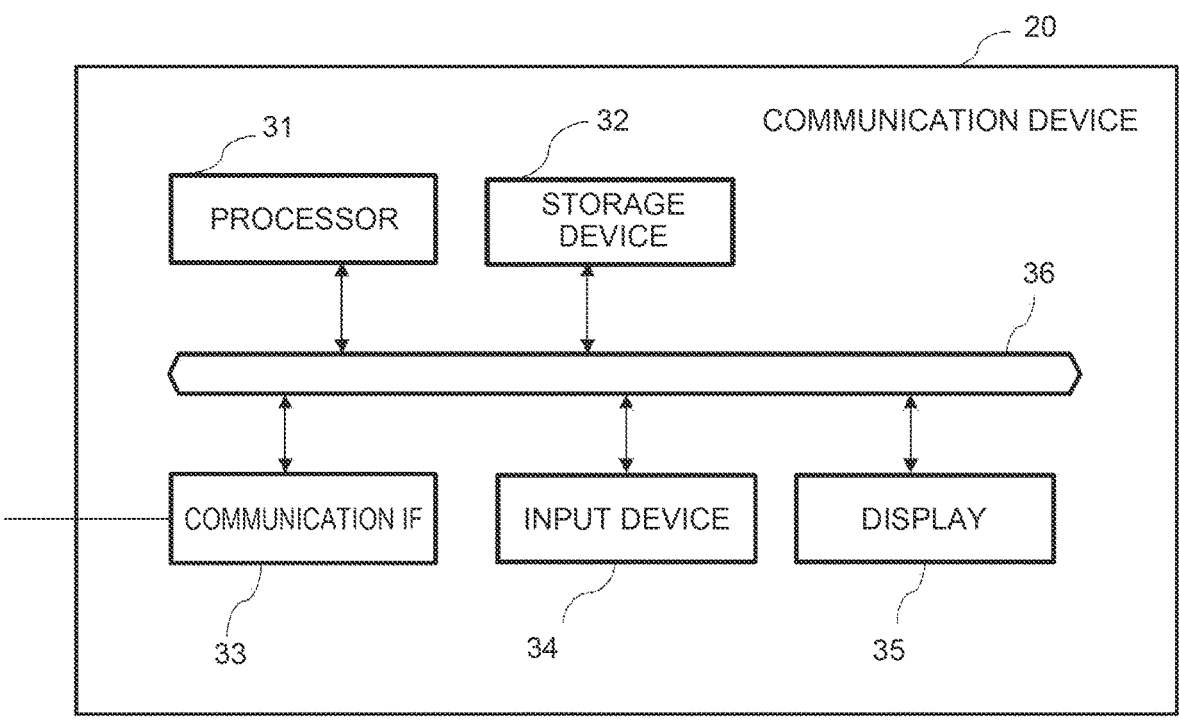
FIG. 3A shows an example of a configuration of a communication device.
Figure 3B:
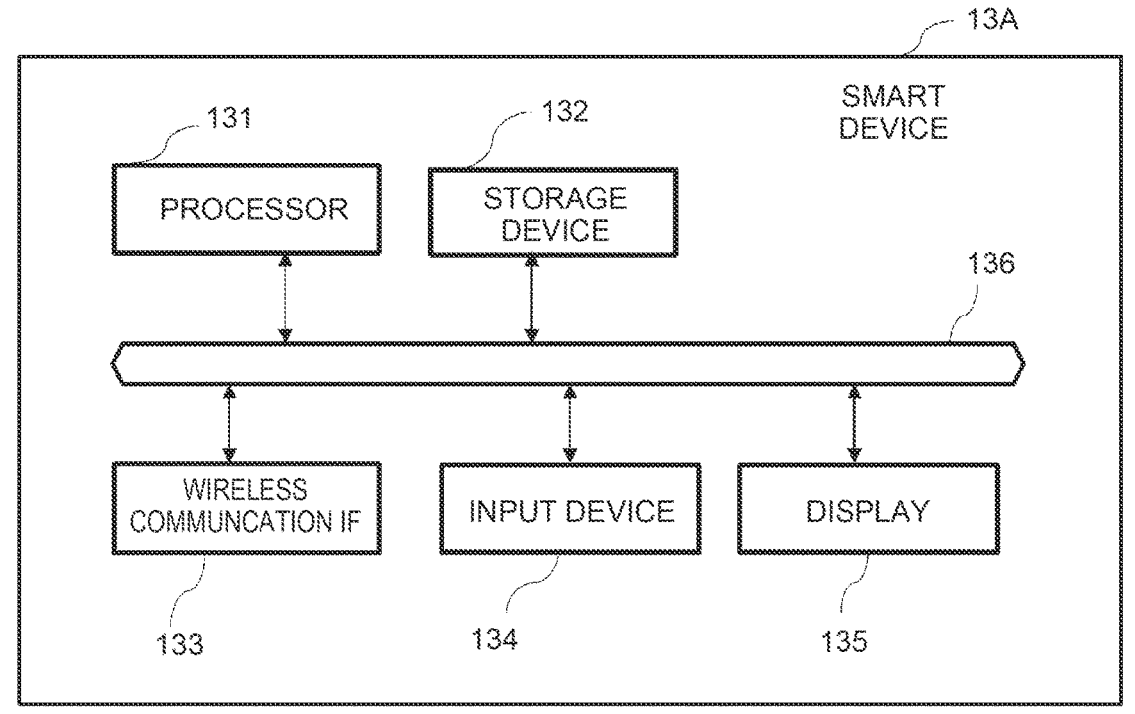
FIG. 3B shows an example of a configuration of a smart device.

FIG. 3A shows an example of a configuration of the communication device 20, and FIG. 3B shows an example of a configuration of the smart device 13A. In FIG. 3A, the communication device 20 includes, as an example, a processor 31, a storage device 32, a communication interface (communication IF) 33, an input device 34, and a display 35.

The storage device 32 stores various programs and data. The processor 31 is an example of a control unit, and is a CPU, a DSP, a GPU a combination of any thereof, or the like. The processor 31 executes various processes, such as calculation or manipulation using the data stored in the storage device 32 and the like, by executing the programs stored in the storage device 32. By executing the programs, the communication device 20 operates as a device including the GW 21, the authentication unit 22, and the routing unit 23. The processor 31 corresponds to a control unit that performs operation as the GW 21, the authentication unit 22, and the routing unit 23. The communication IF 33 includes a communication interface circuit for the telecommunications carrier network 2 and a communication interface circuit for the Internet 1, and performs transmission and reception of communication-related signals, format (protocol) conversion, and the like. The input device 34 is a button, a key, a touch panel, or the like used to input information, make settings, and the like. The display 35 is used to display information.

In FIG. 3B, the smart device 13A includes, as an example, a processor 131, a storage device 132, an input device 134, and a display 135. Such components have similar functions to the processor 31, the storage device 32, the input device 34, and the display 35, although there are differences in performance and type. A wireless communication interface (wireless communication IF) 133 includes a communication interface circuit that enables wireless access to each of telecommunications carrier network, Bluetooth®, and wireless LAN (Wi-Fi). The processor 131 can execute various processes by executing programs stored in the storage device 132.

Figure 4:
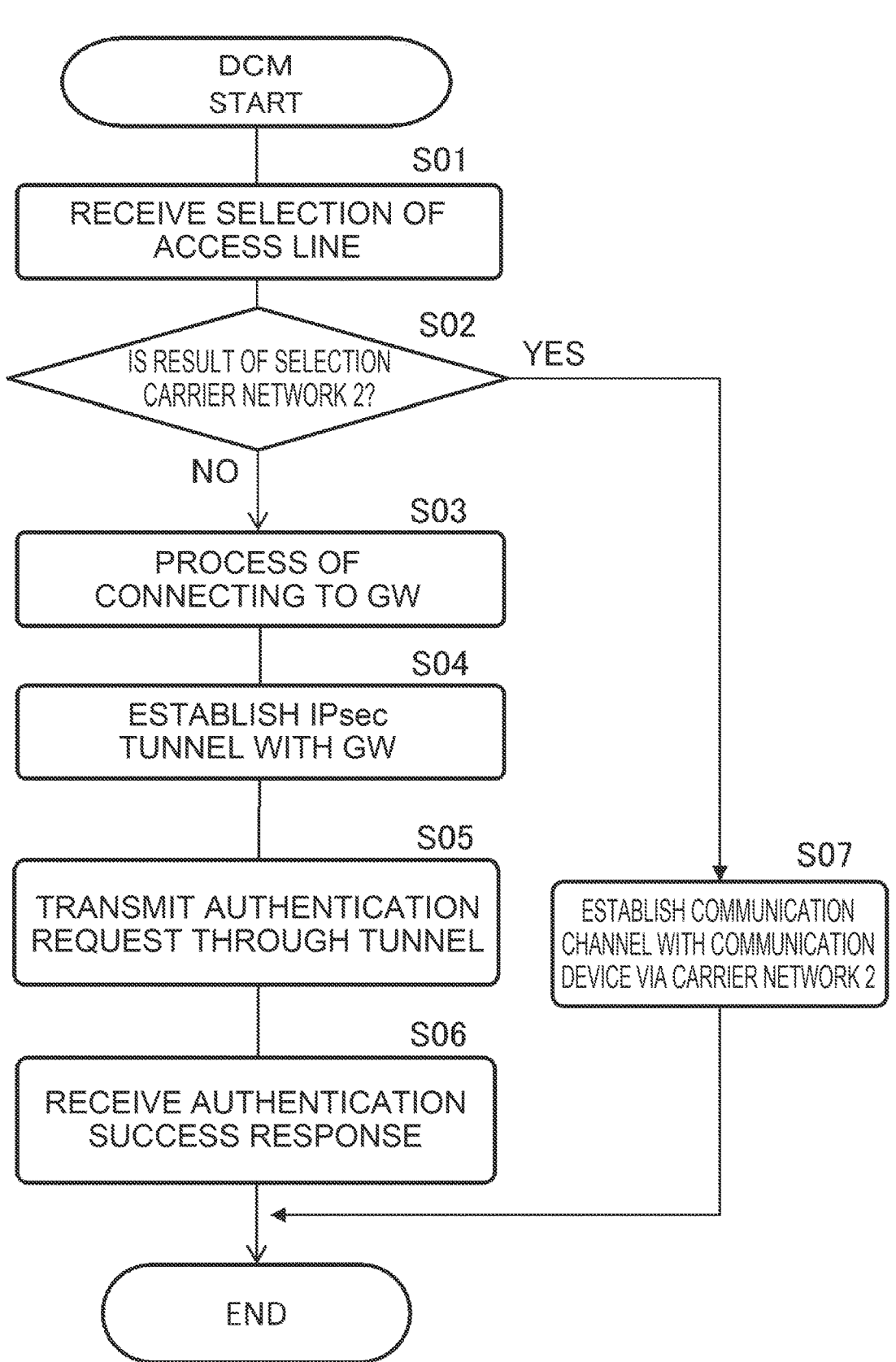
FIG. 4 is a flowchart showing an example of processing by the DCM.

FIG. 4 is a flowchart showing an example of processing by the DCM 10.

Figure 5:
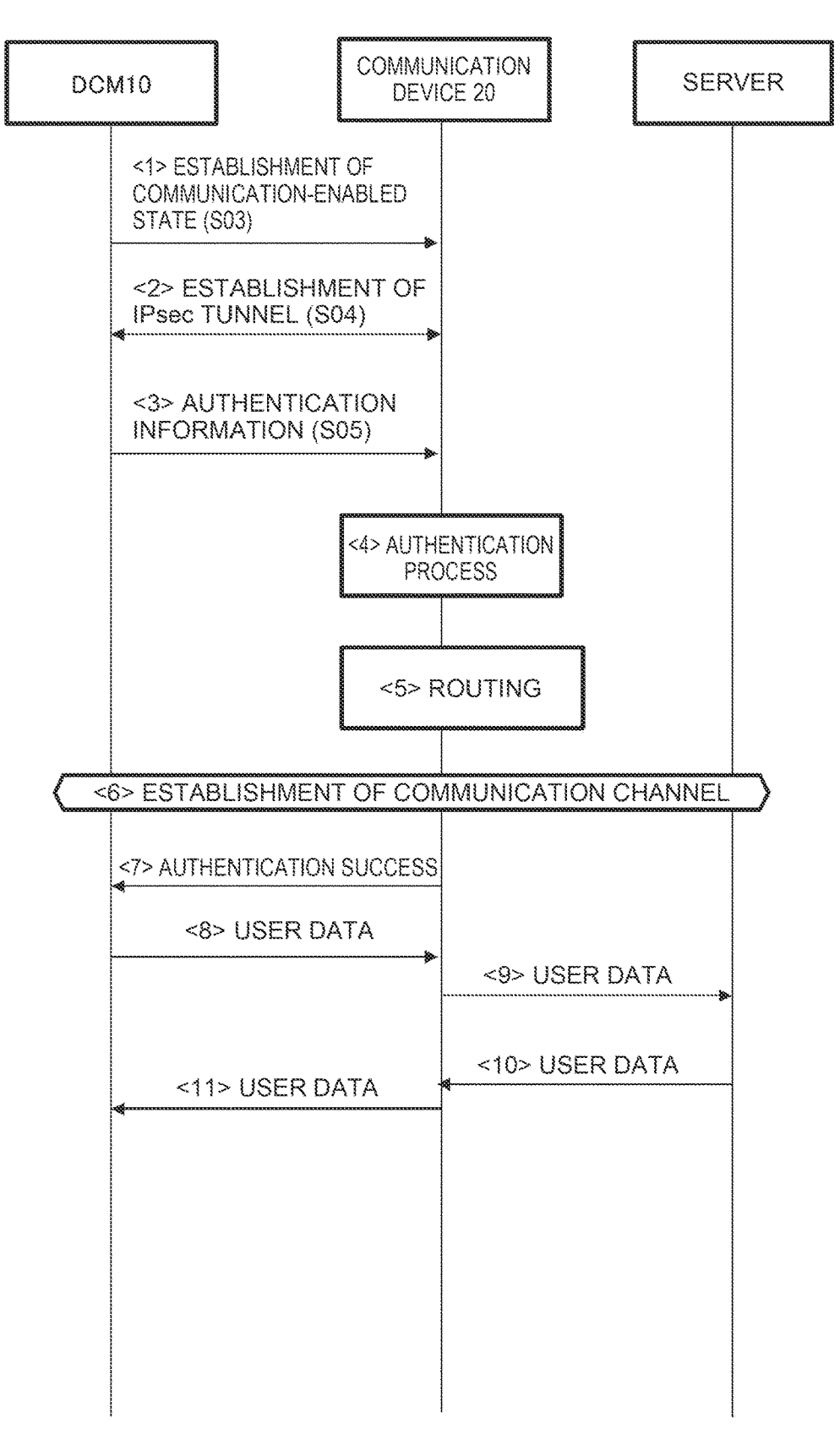
FIG. 5 is a sequence chart showing an example of operation in the communication system.

FIG. 5 is a sequence chart showing an example of operation in the communication system. The processing according to the flowchart shown in FIG. 4 is started, for example, when the user of the vehicle operates the DCM 10 and calls up, on the display 109, a screen for selecting an access line (method of access) to the communication device 20.

In step S01, the CPU 101 of the DCM 10 receives an input that fixes a result of selection of an access line, which is input by the user using the input device 108. In step S02, the CPU 101 determines whether or not the result of selection is the telecommunications carrier network 2. When it is determined that the telecommunications carrier network 2 is selected, the processing moves to step S07, and otherwise the processing moves to step S03.

When the processing moves to step S07, the CPU 101 performs a process of establishing a communication channel with the communication device 20 via the telecommunications carrier network 2. In establishing the communication channel, the DCM 10 transmits a connection request including information on a communication partner to the telecommunications carrier network 2.

Registration of a position, authentication, and the like of the DCM 10 in the telecommunications carrier network 2 are performed by using information (subscriber information, authentication information, and the like) stored in the first SIM 105. For authentication, the CPU 101 performs a process of reading the authentication information stored in the first SIM 105 and transmitting the authentication information to the telecommunications carrier network 2. The telecommunications carrier network 2 includes an authentication unit that is different from the authentication unit 22, and authentication using the authentication information is performed by the authentication unit. The authentication unit 22 is used to perform authentication when an access line other than the telecommunications carrier network 2 is used.

In establishing the communication channel between the DCM 10 and the communication device 20, when the authentication in the telecommunications carrier network 2 succeeds, the telecommunications carrier network 2 performs control for establishing a communication channel that connects the routing unit 23 of the communication device 20 and the DCM 10. In establishing such a communication channel, the routing unit 23 performs routing to the communication partner (for example, the server 51 or 52) of the DCM 10. Through the routing, a state is brought about in which communication (transmission and reception of data) via the communication device 20 (routing unit 23) is enabled between the DCM 10 and the communication partner.

When the processing moves to step S03, the CPU 101 performs a process of connecting to the GW 21. For example, when the MVNO network 3 is selected as the result of selection of an access line, registration of a position, authentication, and the like of the DCM 10 in the MVNO network 3 are performed by using information (subscriber information, authentication information, and the like) stored in the second SIM 106. For authentication, the CPU 101 performs a process of reading the authentication information stored in the second SIM 106 and transmitting the authentication information to the telecommunications carrier network 2. When the authentication succeeds, the MVNO network 3 performs routing to the GW 21, which is a communication partner of the DCM 10, and thus establishes a communication channel between the DCM 10 and the GW 21 (FIG. 5, <1>).

When tethering using the tethering device 13 (smart device 13A or USB dongle 13B) is selected as the result of selection of an access line, the user performs a process of connecting the DCM 10 and the tethering device 13 by using the USB connector 107. Alternatively, a setting is made for pairing the DCM 10 and the smart device 13A through wireless communication (Bluetooth® or Wi-Fi). The DCM 10 transmits data destined for the GW 21 to the tethering device 13. The tethering device 13 accesses an access point of a predetermined wireless LAN by operating like a mobile router, and transmits the data to the GW 21 via the wireless LAN 4 and the Internet. Thus, communication is enabled between the DCM 10 and the GW 21 via the wireless LAN 4 and the Internet 1 (FIG. 5, <1>).

In step 504, the CPU 101 performs a process of establishing a tunnel (IPsec tunnel) in the IPsec tunnel mode between the DCM 10 and the GW 21. For example, a remote access VPN is built in which the DCM 10 corresponds to a terminal and the GW 21 corresponds to VPN equipment (FIG. 5, <2>). Note that for the tunnel, it is conceivable to use SSL/TLS, instead of IPsec.

When the tunnel is established, the CPU 101 performs a process of reading the authentication information from the first SIM 105 and transmitting the authentication information to the GW 21 (FIG. 5, <3>). The authentication information is transferred to the GW 21 through the tunnel. The GW 21 forwards the authentication information to the authentication unit 22. The authentication unit 22 performs an authentication process by using the authentication information (FIG. 5, <4>).

When the authentication is succeeds, the routing unit 23 performs routing of data transmitted and received between the DCM 10 and the communication partner (server 51 or 52) by using information on the communication partner, which is transmitted together with the authentication information (or may be transmitted at another timing) from the DCM 10 (FIG. 5, <5>). As a result of the routing, a state is brought about in which the routing unit 23 transmits data from the DCM 10 toward the communication partner and transmits data from the communication partner toward the DCM 10. In other words, the DCM 10 falls in a state of being able to communicate with the communication partner (FIG. 5, <6>).

Thereafter, information notifying authentication success (that communication is enabled) is transmitted from the communication device 20 to the DCM 10 (FIG. 5, <7>), and is received by the DCM 10 (step S06). Thereafter, user data such as vehicle-related data transmitted from the DCM 10 arrives at the communication device 20 through the tunnel, and is received by the communication partner via the routing unit 23 of the communication device 20 (FIG. 5, <8> and <9>). Data addressed to the DCM 10 from the communication partner passes through the routing unit 23, and is received by the DCM 10 through the tunnel (FIG. 5, <10> and <11>).

According to the communication system in the embodiment, authentication information is handed over from the DCM 10 to the communication device 20 by using the tunnel established between the DCM 10 (in-vehicle terminal) and the communication device 20. Accordingly, the problem concerning reliability of an access network existing between the DCM 10 and the communication device 20 can be disregarded. In other words, communication between the DCM 10 and the communication device 20 is performed in an encrypted state due to the tunnel (VPN connection). Thus, even in a route via the Internet 1, reliability of a communication is ensured. Accordingly, the user can flexibly select an access line.

When an access line other than the telecommunications carrier network 2 is used, authentication using the common authentication information is performed by the authentication unit 22 of the communication device 20, regardless of a result of selection of an access line. The common authentication information among access lines (access networks) is the authentication information used when the telecommunications carrier network 2 is used. Accordingly, since the DCM 10 (user (subscriber)) can be authenticated by using a similar scheme to the scheme used when the telecommunications carrier network 2 is used, it is possible to restrain the configuration of the DCM 10 (in-vehicle terminal) from being complicated.

The DCM 10 can be configured to, or can be changed to a setting to, receive only data coming from the communication device 20 and reject data coming from others than the communication device 20. With the configuration thus made, since the DCM 10 does not need to determine whether or not a communication partner is a reliable one, the configuration of the DCM 10 can be simplified. Since the DCM 10 can be dedicated to communication with the communication device 20, all functions including routing can be deployed on the communication device 20 side, with future provision of an advanced application in mind.

When communication is performed between the DCM 10 and the communication device 20 through tethering using the smart device 13A (for example, a smartphone of the user), a communication fee is charged via a charging mechanism 40 (FIG. 1) on a network. The communication fee in such a case can be charged to the user. For example, when the user signs a contract to pay a flat rate for up to a certain communication amount with regard to a fee for communication by the smartphone, communication through tethering as described above can be performed within the rest of the communication amount covered by the flat rate. Thus, the business operator side does not need to bear tethering-related communication costs. The user also has a benefit of practically not needing to incur a communication cost because communication is performed within the coverage of the flat rate. Moreover, when the communication amount that can be used for a certain price under flat-rate pricing increases in the future, an application program used by the DCM 10 can be changed to one that, though using a more communication amount, is more convenient.

In operation related to such a communication fee for tethering, an application program (app) that performs processing as follows may be installed in the smart device 13A.

When tethering is performed, it is notified that the user is charged a communication fee. The notification is performed by, for example, displaying such a notification on the display 125.

When tethering is performed, a communication amount that has been already used, of a communication amount that can be used within the flat rate, is notified, or the rest of the communication amount that can be used within the flat rate is notified.

When the communication amount that has been already used, of the communication amount that can be used within the flat rate, is a threshold value or more (or the rest of the communication amount that can be used within the flat rate is less than a threshold value), a notice related to use of tethering is issued (for example, is displayed on the display 125). Alternatively, use of tethering is inhibited (a state is brought about in which connection or pairing between the DCM 10 and the smart device 13A is disabled).

Configurations as follows may also be adopted.

The communication amount of the DCM 10 is controlled, depending on an increase or a decrease in communication amount that can be allowed by the user. The amount of communication performed by the DCM 10 toward the communication device 20 may be increased or decreased in some cases, and the amount of communication from the communication device 20 toward the DCM 10 may be increased or decreased in some cases.

In response to a request from the DCM 10 to install an application for communication, the communication device 20 permits the application to be installed according to a communication amount allowed by the user. In other words, a type of application that can be installed in the DCM 10 is controlled, according to a communication amount that can be used by the user within the flat rate.

Any of the processes and the means described in the present disclosure can be freely combined and implemented to an extent that no technical inconsistency occurs. Moreover, a process described as being executed by a single device may be executed by a plurality of devices in a divided manner. Alternatively, a process described as being executed by different devices may be executed by a single device. It can be flexibly changed what hardware configuration (server configuration) is used to implement individual functions in a computer system. The present disclosure can also be implemented by providing a computer with a computer program in which the functions described in the embodiment are packaged, and by one or more processors included in the computer reading and executing the program. Such a computer program may be provided to the computer by using a non-transitory computer-readable recording medium that is capable of connecting to a system bus of the computer, or may be provided to the computer via a network. Examples of the non-transitory computer-readable recording medium include any types of disks, such as magnetic disks (Floppy® disk, hard disk drive (HDD), and the like) and optical disks (CD-ROM, DVD disk, Blu-ray Disc, and the like), a read only memory (ROM), a random access memory (RAM), an EPROM, an EEPROM, a magnetic card, a flash memory, an optical card, and any types of media suitable to store electronic instructions.

What is claimed is:

1. A communication computer configured to communicate with a data communication module (DCM) through a telecommunications carrier network and a mobile virtual network operator (MVNO) network, the communication computer comprising a first processor that includes a gateway connected to an internet, an authentication unit configured to authenticate authentication information data, and a routing unit, the DCM being mounted in a vehicle and including a second processor, a user interface, a first subscriber identity module (SIM), and a second SIM, the first SIM storing first authentication information data of the DCM, the second SIM storing second authentication information data of the DCM, the telecommunications carrier network being contracted by a user of the vehicle and configured to authenticate the first authentication information data, the MVNO network being connected to the internet, and the second processor being configured to determine whether the telecommunications carrier network or the MVNO network is selected by the user through the user interface, establish a first communication channel between the DCM and the communication computer via the telecommunications carrier network in response to the determination that the telecommunications carrier network is selected by the user, transmit the first authentication information data to the telecommunications carrier network, establish an IPsec tunnel between the DCM and the gateway over the MVNO network and the internet only in response to the determination that the MVNO network is selected by the user, transmit the second authentication information data to the gateway through the IPsec tunnel, wherein the first processor is configured to cause the routing unit to perform routing of data between the DCM and a server in response to an authentication of the first authentication information data succeeding in the telecommunications carrier network and a second communication channel between the DCM and the routing unit being established by the telecommunications carrier network, cause the gateway to transmit the second authentication information data to the authentication unit only in response to the MVNO network being selected by the user and the IPsec tunnel being established, cause the authentication unit to authenticate the second authentication information data, and cause the routing unit to perform routing of the data between the DCM and the server in response to an authentication of the second authentication information data succeeding.

2. A combination of a communication computer, a data communication module (DCM), a telecommunications carrier network, and a mobile virtual network operator (MVNO) network, the combination comprising:

the communication computer including a first processor that includes a gateway connected to an internet, an authentication unit configured to authenticate authentication information data, and a routing unit;

the DCM mounted in a vehicle and including a second processor, a user interface, a first subscriber identity module (SIM), and a second SIM, the first SIM storing first authentication information data of the DCM, and the second SIM storing second authentication information data of the DCM;

the telecommunications carrier network contracted by a user of the vehicle and configured to authenticate the first authentication information data; and the MVNO network connected to the internet, wherein the second processor is configured to determine whether the telecommunications carrier network or the MVNO network is selected by the user through the user interface, establish a first communication channel between the DCM and the communication computer via the telecommunications carrier network in response to the determination that the telecommunications carrier network is selected by the user, transmit the first authentication information data to the telecommunications carrier network, establish an IPsec tunnel between the DCM and the gateway over the MVNO network and the internet only in response to the determination that the MVNO network is selected by the user, and transmit the second authentication information data to the gateway through the IPsec tunnel, and the first processor is configured to cause the routing unit to perform routing of data between the DCM and a server in response to an authentication of the first authentication information data succeeding in the telecommunications carrier network and a second communication channel between the DCM and the routing unit being established by the telecommunications carrier network, cause the gateway to transmit the second authentication information data to the authentication unit, cause the authentication unit to authenticate the second authentication information data, and cause the routing unit to perform routing of the data between the DCM and the server in response to an authentication of the second authentication information data succeeding.

3. The combination according to claim 2, wherein the first processor is further configured to reject data that is not transmitted from the communication computer.

* * * * *